US005362231A

United States Patent [19]

Groom

[11] Patent Number: 5,362,231

[45] Date of Patent: Nov. 8, 1994

[54] ARTICLE SUPPORT APPARATUS

[76] Inventor: Bryan Groom, 10 Barwood Avenue, Church Lawton, Stoke-on-Trent, Staffordshire, United Kingdom, ST7 3EN

[21] Appl. No.: 952,733

[22] PCT Filed: May 28, 1991

[86] PCT No.: PCT/GB91/00848

§ 371 Date: Nov. 30, 1992

§ 102(e) Date: Nov. 30, 1992

[87] PCT Pub. No.: WO91/19149

PCT Pub. Date: Dec. 12, 1991

[30] Foreign Application Priority Data

Jun. 1, 1990 [GB] United Kingdom ................ 9012294

[51] Int. Cl.[5] ......................... F27D 5/00; C04B 33/32

[52] U.S. Cl. .................................... 432/258; 248/201; 432/259

[58] Field of Search .............. 432/225, 226, 251, 258, 432/259; 248/201

[56] References Cited

U.S. PATENT DOCUMENTS

| | | | |
|---|---|---|---|
| 1,384,468 | 7/1921 | Howell | 432/259 |
| 2,543,549 | 2/1951 | Jeppson | 432/258 |
| 4,259,061 | 3/1981 | Dubetsky | 432/258 |
| 4,315,738 | 2/1982 | Lovatt | 432/258 |
| 4,564,489 | 1/1986 | Welzen et al. | 432/259 X |

FOREIGN PATENT DOCUMENTS

| | | | |
|---|---|---|---|
| 0030293 | 11/1980 | European Pat. Off. . | |
| 2056957 | 5/1972 | Germany | 432/258 |
| 340376 | 1/1931 | United Kingdom . | |
| 911272 | 11/1962 | United Kingdom | 432/259 |
| 1077880 | 8/1967 | United Kingdom . | |
| 2140140 | 11/1984 | United Kingdom . | |

*Primary Examiner*—Henry A. Bennet
*Assistant Examiner*—William C. Doerrler
*Attorney, Agent, or Firm*—Smith-Hill and Bedell

[57] ABSTRACT

A setter (10) for supporting an article of ceramic ware. The setter (10) comprising two identical engageable components (14). The components (14) comprise profiled pieces of recrystallised silicon carbide. The components (14) are generally 'C' shaped and have engagement means in the form of a step (16) on the ends of the side members of the 'C' permitting engagement between the components (14) to define a planar support surface comprising a continuous band of material surrounding an open area.

23 Claims, 6 Drawing Sheets

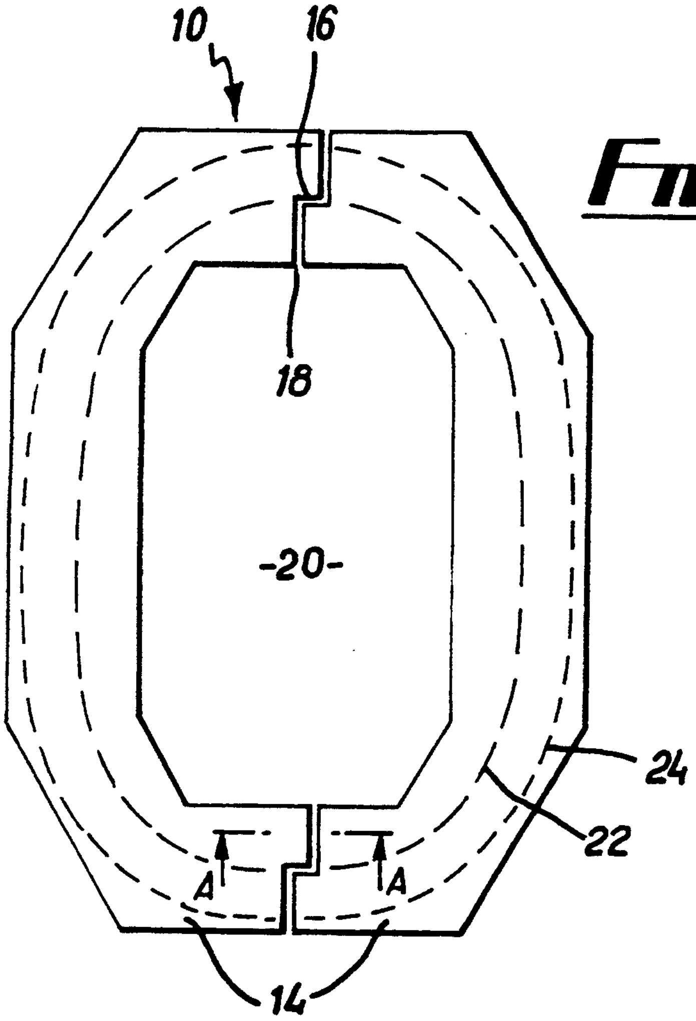
FIG. 2
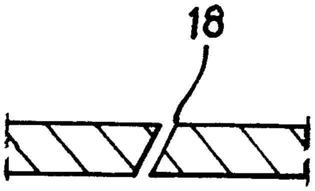
FIG. 3
FIG. 4A
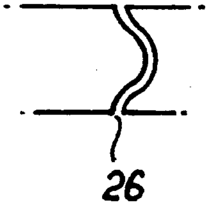
FIG. 4B
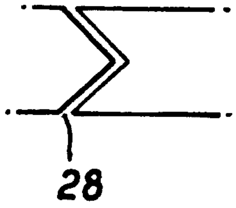
FIG. 4C
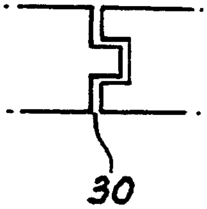
FIG. 4D
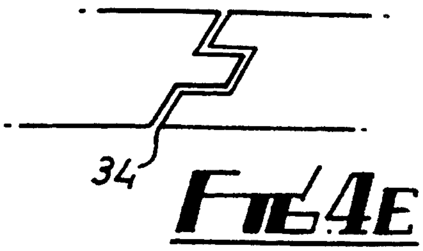
FIG. 4E

ARTICLE SUPPORT APPARATUS

This invention relates to article support apparatus and particularly but not exclusively to apparatus for supporting ceramic articles during firing.

It is usual to offer support to ceramic products during one or all of the firing processes that occur during manufacture and the supports employed must have sufficient strength to carry the load at the temperatures encountered without detrimental affect to the ceramic product. Such supports can be made from any suitable refractory material and are commonly referred to as setters.

In the whitewares industry articles may require support either at their base, foot, top or rim, this being dependant on their shape, form, or design characteristics, together with their ultimate use or function.

Setters may be required to offer full support over the total area of the article, or partial support. In the case of some tableware items a full profile support is necessary. Alternatively support only of the wall section of an item may be required.

FIGS. 1A to C show a typical sanitary closet which requires support during firing for only its base, which is hollow, as illustrated in FIG. 1C. This illustrates the very small actual surface area of contact between product and setter necessary to achieve the desired results.

Tableware plates may require foot support only to retain shape during firing processes.

It is usual to avoid setter contact with any glazed or decorated areas so as not to detract from the appearance of the final product.

The weight of setters in a kiln load can exceed the weight of ware and thus consumes a considerable amount of energy in heating the setters. Setters are relatively expensive and can contribute to rejection of products due to deterioration in the setters during continual re-use at high temperatures. In recent years the trend has been to use higher grade refractory materials for setters but this greatly increases their cost.

According to the present invention there is provided article support apparatus comprising two substantially planar components detachably engagable together to define a planar support surface comprising a continuous band of material surrounding an open area.

Engagement means are preferably provided on the components. The engagement means preferably substantially prevent relative movement between engaged components in a first direction, and desirably also in a second direction perpendicular to the first direction. The first and second directions preferably lie in the plane of the apparatus.

The engagement means may comprise a projection from one component engagable in a corresponding recess on the other component. The greatest width of the projection may be greater than the opening of the recess.

The components are preferably both identical. Some or all of the side edges of the components are preferably bevelled. The components are desirably made of a refractory material and especially recrystallised silicon carbide.

The components may be substantially 'C' shaped or alternatively 'L' shaped.

The components are preferably shaped such that a supported part of an article to be fired lies substantially adjacent the inner edge of the band formed by the apparatus when the article has been fired, and substantially adjacent an outer edge of said band at the maximum size of the article, so allowing for expansions and contractions of the article which occur during firing.

Elongate refractory members may be provided engagable beneath the components to provide support therefor. Upstanding spaced portions may be provided on the elongate members defining recesses therebetween to locate the components, thereby providing a required spacing between respective pairs of components.

Alternatively spacer members may be provided engagable on the elongate members between respective pairs of components to provide the required spacing. As a further alternative, spacing lugs may be provided on the components engagable with corresponding lugs on adjacent components to provide the required spacing.

The elongate members may be stepped such that adjacent components can be supported at different heights.

A grip enhancing coating may be provided on the components which may be of alumina.

Embodiments of the present invention will now be described by way of example only with reference to the accompanying drawings, in which:

FIGS. 1A, B and C are respectively an end view, side view and a view from beneath of an item of sanitary ware which could be supported by apparatus according to the present invention;

FIG. 2 is a diagrammatic plan view of support apparatus according to the invention;

FIG. 3 is a sectional view along the line A—A in FIG. 2;

FIGS. 4A–4E are plan views of parts of five modified apparatus similar to that shown in FIG. 2;

Figure 5:
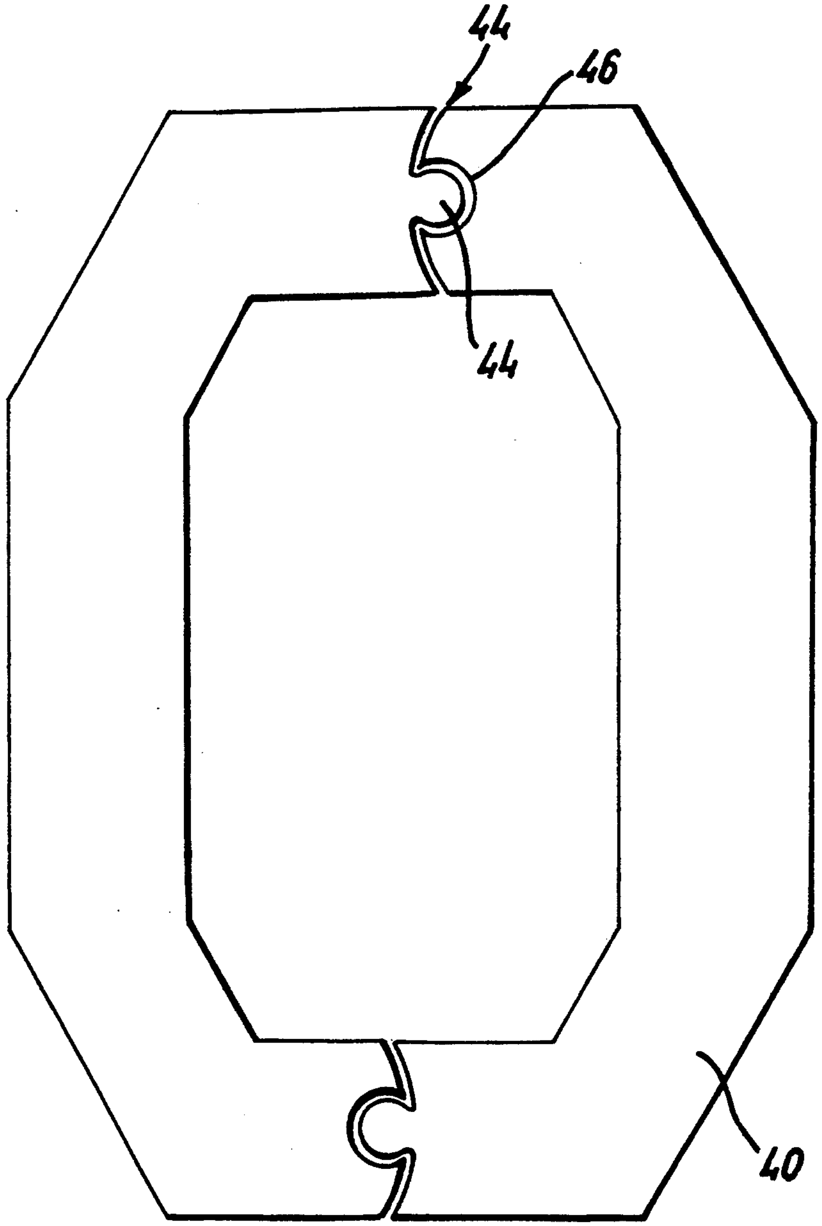
Figure 6:
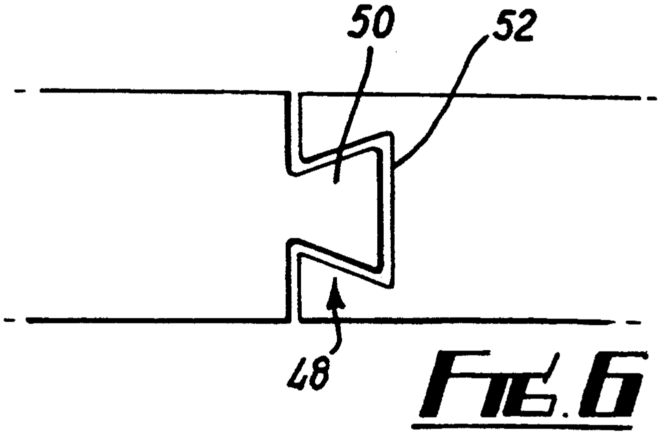
Figure 7:
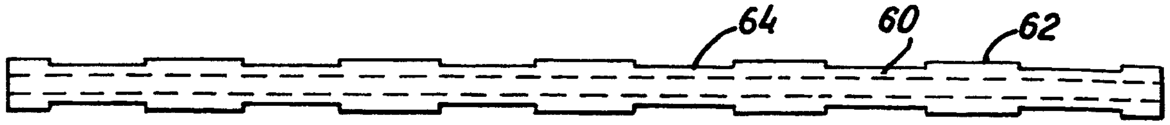
Figure 8:
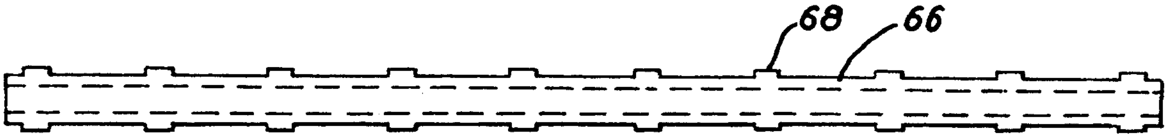
Figure 9:
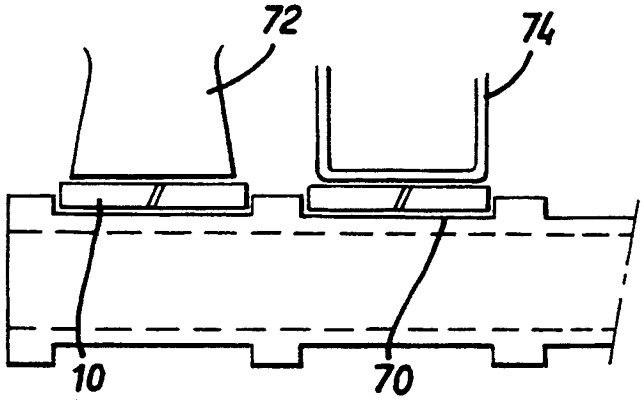
Figure 10:
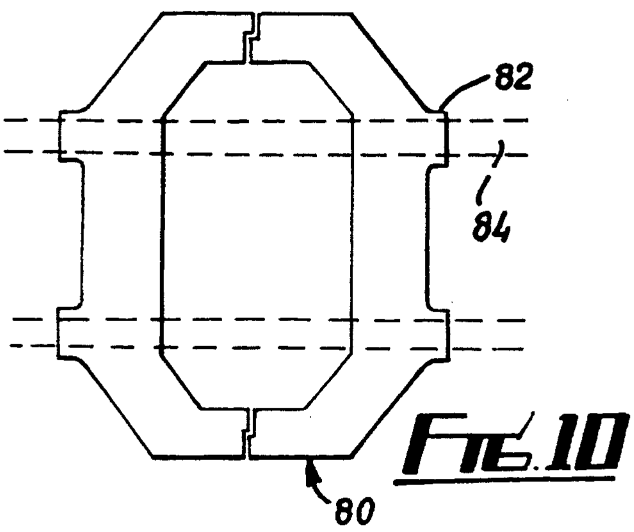
Figure 11:
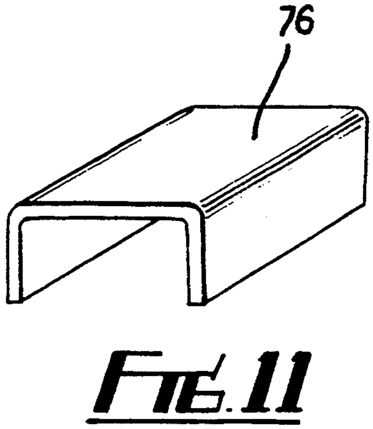
Figure 12:
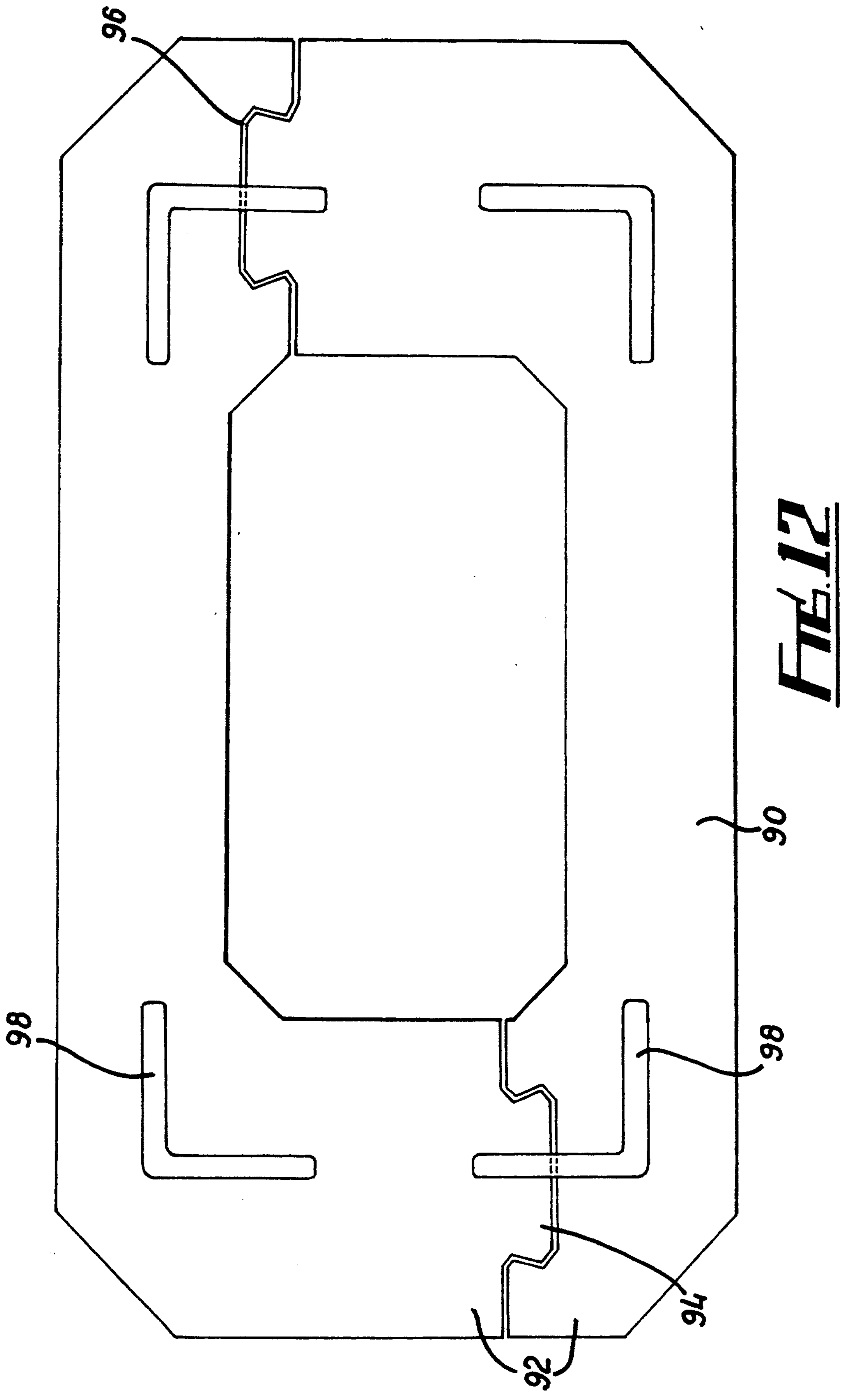
Figure 13:
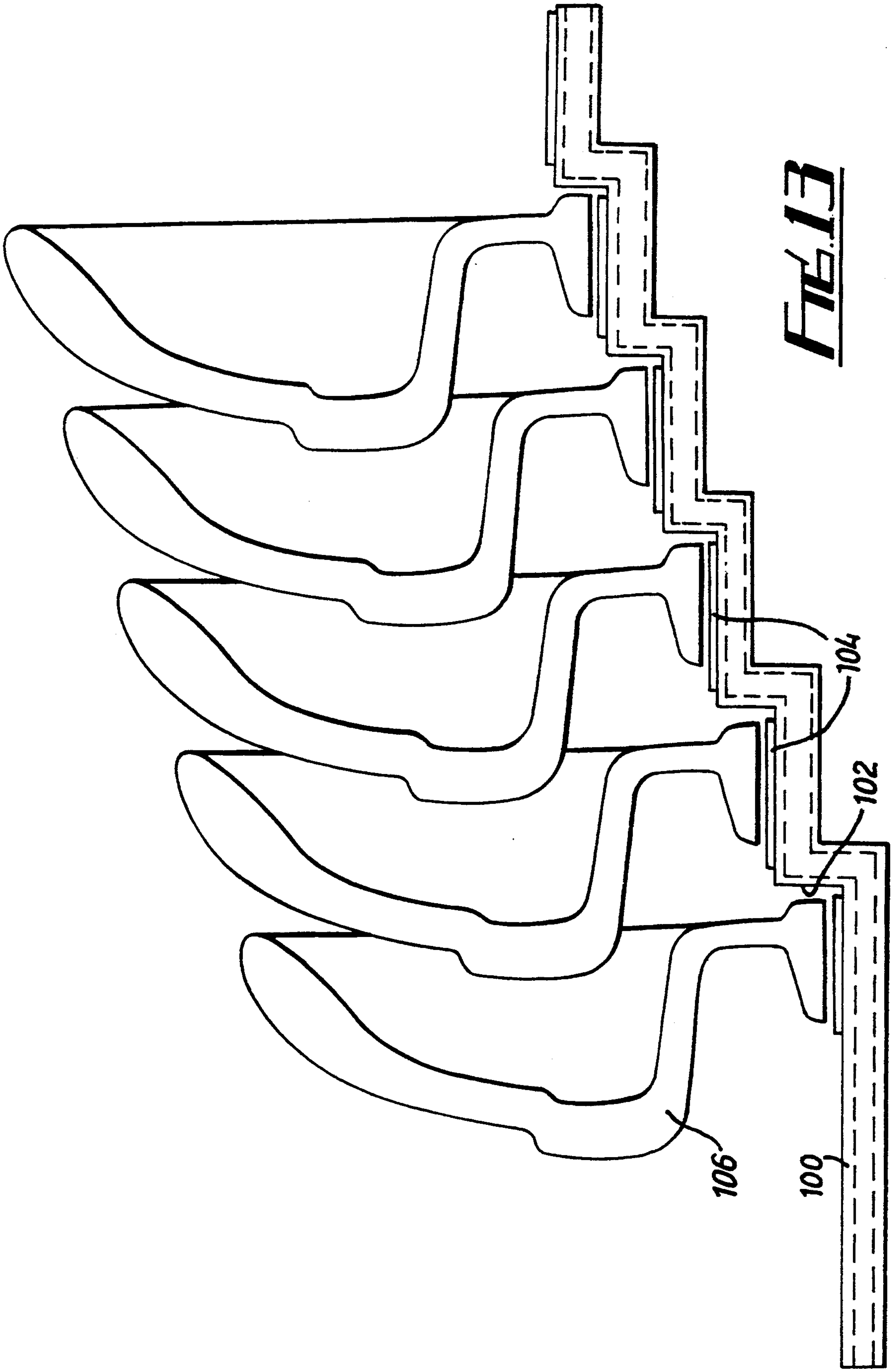

FIG. 5 is a plan view of a further support apparatus according to the present invention; FIG. 6 is a plan view of part of another support apparatus according to the invention; FIG. 7 is a side view of a elongate member according to the invention;

FIG. 8 is a similar view to FIG. 7 of a further elongate member according to the invention;

FIG. 9 is a side view of part of the member of FIG. 8 in use;

FIG. 10 is a plan view of a still further support apparatus according to the invention;

FIG. 11 is a perspective view of a spacer member according to the invention;

FIG. 12 is a plan view of a yet further support apparatus according to the invention; and FIG. 13 is a side view in use of a still further elongate member according to the invention.

Figure 1B:
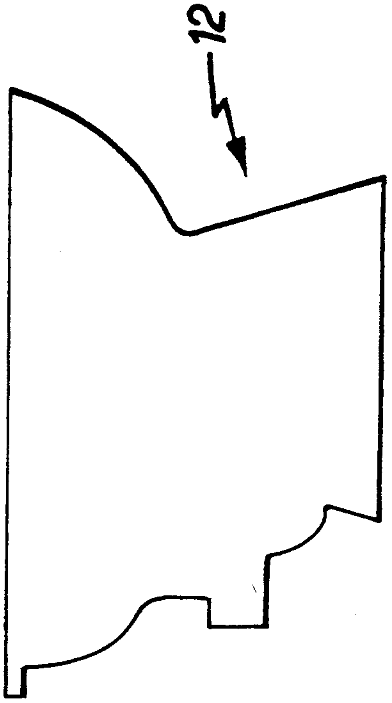
Figure 1C:
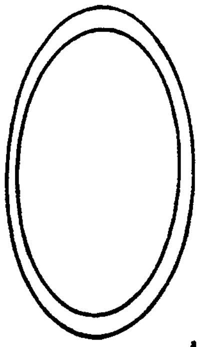
Figure 1A:
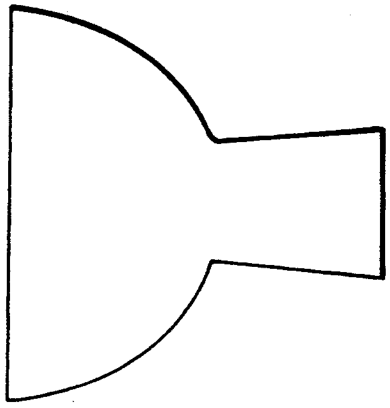

FIG. 2 shows a setter 10 for supporting an article of ware such as a sanitary closet 12 as illustrated in FIGS. 1A to C. The setter 10 comprises two identical engagable components 14. The components 14 comprise profiled pieces of a refractory material such as recrystallised silicon carbide. The components 14 are generally 'C' shaped and have engagement means in the form of a step 16 on the ends of the side limbs of the 'C'. The step 16 provides engagement between the components 14 and reduces relative movement therebetween. The ends 18 or the side limbs of the 'C' are bevelled (as shown in FIG. 3) to improve engagement between the components 14 and to provide a level support surface.

The components 14 engage with each other with the openings of each respective 'C' facing towards each other to define a central opening 20. Marked in dotted lines 22,24 in FIG. 2 are respectively the approximate positions of the inner edge of the base walls of the closet 12 when cool after firing and the outer edge of the base walls during firing, at the point of maximum size of the closet 12.

FIGS. 4A–4E illustrate number of different engagement means which can be provided on the ends of the side limbs of the 'C' in place of the step 16. As shown in FIGS. 4A–4C respectively, the engagement means may comprise rounded, angular, or square projections 26, 28 or 30. Alternatively the step 16 may be inclined relative to the side limbs 32, (FIG. 4D) or a projection may be provided which is inclined relative to the side limbs 34 (FIG. 4E).

FIG. 5 shows a similar setter 40 with engagement means 42 which comprise a rounded projection 44 engagable in a corresponding recess 46. The greatest diameter of the projection 44 is larger than the opening of the recess 46 such that the components of the setter 40 can only be separated by relative sliding in a direction substantially perpendicular to the plane of the setter 40. FIG. 6 illustrates similar engagement means 48 in the form of a dovetail shape projection 50 and a corresponding recess 52.

FIG. 7 shows a beam 60 of refractory material such as recrystallised silicon carbide. A plurality of spaced upstanding projections 62 are provided on the beam 60. The projections 62 define recesses 64 therebetween which can locate setters of the types previously described, to provide the required spacing between adjacent setters and thus the ware carried thereon. FIG. 8 shows a similar beam 66 but with smaller upstanding projections 68. FIG. 9 shows the beam of FIG. 8 in use, with setters 10 thereon located in the recesses 70 defined between the projections 68, and carrying articles of ware 72,74. If required spacer members of a refractory material such as illustrated in FIG. 11 may be placed on the beams 60,66 or conventional beams to provide the required separation between adjacent setters. The spacer 76 shown in FIG. 11 comprises a length of a wide based 'U' section material. The provision of the upstanding projections 62,68 and/or spacers 76 also aids in ensuring that the components of the setters do not separate during firing. FIG. 10 shows a further setter 80 similar to the setter 10 except that spacer lugs 82 are provided extending from the rear of the 'C' corresponding in location to underlying support beams 84, to separate adjacent setters 80 and also to ensure that the respective components of the setters 80 do not separate from each other.

FIG. 12 shows a further two piece setter 90. The setter 90 comprises two identical engagable 'L' shaped components 92. A dovetailed shaped projection 94 extends sideways from the base of the 'L' with a corresponding sideways facing recess 96 being provided adjacent the free end of the stem of the 'L'.

The use of 'L' shaped components ensures that the joint between the support components 92 is spaced from any central casting seams (mould joints) of the ware thereby avoiding straining of the ware. 'L' shaped components are relatively easy to manufacture and permit extension in either length or width. When the setter 90 is employed in an elevated position support can be provided at the corners only. Such support is shown in FIG. 12 by four 'L' shaped cross-section risers 98 which are mountable on beams of the type hereinbefore described. The risers 98 are of a size that a limb of the respective two risers nearest the joins between the components 92 extends beneath the respective join.

FIG. 13 shows a beam 100 of refractory material such as recrystallised silicon carbide. The beam 100 has a plurality of steps 102 provided along its length extending upwardly towards one end. FIG. 13 shows the beam 100 supporting a plurality of setters 104 (in conjunction with another such beam) according to the invention. The setters 104 each support an item of ware 106 such as a basin. The steps 102 permit the items of ware 106 to be supported at different heights whereby a projection on an item of ware 106 can be aligned next to a recess on an adjacent item of ware 106 permitting closer spacing of said items 106.

There is thus described a system for supporting ceramic ware during firing. The apparatus of this system provides for a number of advantages over conventional systems. The provision of the setters in two parts means that the setters are easier to form and to handle, especially when in an unfired state during their manufacture. Further these setters are easier to handle during loading of for example a kiln car as they are a more convenient shape than conventional setters and lighter. If one of the components becomes damaged, then as the components are identical only the one component will have to be replaced and the whole setter is not lost.

Obviously different setters can be designed for different applications such that the minimum support area is provided, thus reducing the weight of the setter in a kiln and thus the energy absorbed by the setters. The provision of bevelled edges eases manufacture of the setters and particularly the removal of the setters from the forming moulds. The opening in the setters provides for better ventilation of the ware during firing.

The provision of upstanding projections on refractory beams and/or spacer members and/or spacer lugs on the setters, enables a neat configuration of ware to be arranged. This also provides for adjacent setters to engage with each other such that the components of the setters do not move apart during firing. It is to be realised that as the items of ware are fired they will tend to expand and subsequently contract thus sliding over the setters and urging the components of the setters to separate. The use of an advanced refractory material such as recrystallised silicon carbide provides a material with a longer working life, and the shape of the setters means that less of this relatively expensive material is used than is conventional.

Various modifications may be made without departing from the scope of the invention. For example, the setters may take any required shape and if required may be formed from more than two components. Different engagement means than those illustrated may be used. The setters may be made from a different refractory material, such as perhaps cordierite. An anti-skid alumina coating may be provided on the setters.

I claim:

1. Article support apparatus, for supporting a single article of ceramic ware during firing of the article, comprising two components each having an upper planar surface and also having a lower surface, each component having a first engagement means that is detachably engagable with a corresponding engagement means of the other component, so that when the components are engaged, their upper planar surfaces are coplanar and define a planar support surface on which the article rests during firing of the article, said planar support surface comprising a continuous band of material surrounding an open area, and wherein the dimension of the apparatus perpendicular to the coplanar upper surfaces is substantially less than the overall dimensions of the apparatus parallel to the coplanar upper surfaces.

2. Apparatus according to claim 1, wherein engagement of the engagement means substantially prevents relative movement between engaged components in a first direction.

3. Apparatus according to claim 2, wherein engagement of the engagement means substantially prevents relative movement between engaged components also in a second direction perpendicular to the first direction.

4. Apparatus according to claim 2, wherein engagement of the engagement means substantially prevents relative movement between engaged components also in a second direction perpendicular to the first direction, said first and second directions being parallel to said coplanar upper surfaces.

5. Apparatus according to claim 2, wherein the first engagement means comprises a projection from one component and the corresponding engagement means comprises a recess on the other component, and the greatest width of the projection is greater than the opening of the recess.

6. Apparatus according to claim 1, wherein the first engagement means comprises a projection from one component and the corresponding engagement means comprises a recess on the other component.

7. Apparatus according to claim 1, wherein the components are substantially identical.

8. Apparatus according to claim 1, wherein each component has side edges, and at least some of the side edges of the components are bevelled.

9. Apparatus according to claim 1, wherein the components are made of a refractory material.

10. Apparatus according to claim 9, wherein the components are made of recrystallized silicon carbide.

11. Apparatus according to claim 1, wherein the components are substantially 'C' shaped.

12. Apparatus according to claim 1, wherein the components are substantially 'L' shaped.

13. Apparatus according to claim 1, wherein the components are shaped such that a supported part of the article to be fired lies substantially adjacent the inner edge of the band formed by the apparatus when the article has been fired, and substantially adjacent an outer edge of said band at the maximum size of the article, so allowing for expansions and contractions of the article which occur during firing.

14. Apparatus according to claim 1, comprising a grip enhancing coating on the components.

15. Apparatus according to claim 14, wherein the grip enhancing coating is of alumina.

16. Apparatus according to claim 1, further comprising elongate refractory members engagable beneath the components to provide support therefor.

17. Apparatus according to claim 16, wherein the elongate members have upstanding spaced portions defining recesses therebetween to locate the components, thereby providing a required spacing between two pairs of components.

18. Apparatus according to claim 16, comprising spacer members engagable on the elongate members to provide a required spacing between two pairs of components.

19. Apparatus according to claim 16, wherein spacing lugs are provided on the components to engage corresponding lugs on other components to provide a required spacing between two pairs of components.

20. Apparatus according to claim 16, wherein the elongate members are stepped such that adjacent components can be supported at different heights.

21. Apparatus for supporting articles of ceramic ware during firing of the articles, said apparatus comprising at least two setters each setter supporting a single article of ceramic ware during firing of the article and comprising a pair of components, each component of each pair having an upper planar surface and also having a lower surface and having an engagement means that is detachably engagable with a corresponding engagement means of the other component of the pair, so that when a pair of components is engaged to form a setter, the upper planar surfaces of the components are coplanar and define a planar support surface on which an article rests during firing of the article, said planar support surface comprising a continuous band of material surrounding an open area, and wherein the dimension of the engaged pair of components perpendicular to the coplanar upper surface is substantially less than the overall dimensions of the engaged pair of components parallel to the coplanar upper surface, and wherein each component has a spacing lug means engagable with a corresponding spacing lug means on a component of another pair to provide a required spacing between the pairs of components.

22. A method of supporting a single article of ceramic ware, comprising providing two components detachably engaged together to define a planar support surface comprising a continuous band of material surrounding an open area, and placing the article of ceramic ware so that it rests on the planar support surface.

23. A method according to claim 22, further comprising firing the article of ceramic ware resting on the planar support surface, and wherein the components are shaped such that a supported part of the article lies substantially adjacent the inner edge of the band formed by the apparatus when the article has been fired, and substantially adjacent an outer edge of said band at the maximum size of the article, whereby expansions and contractions of the article during firing are accommodated.

* * * * *